Feb. 21, 1933.　　A. MILLIGAN　　1,898,590
SHOVEL
Filed June 19, 1931
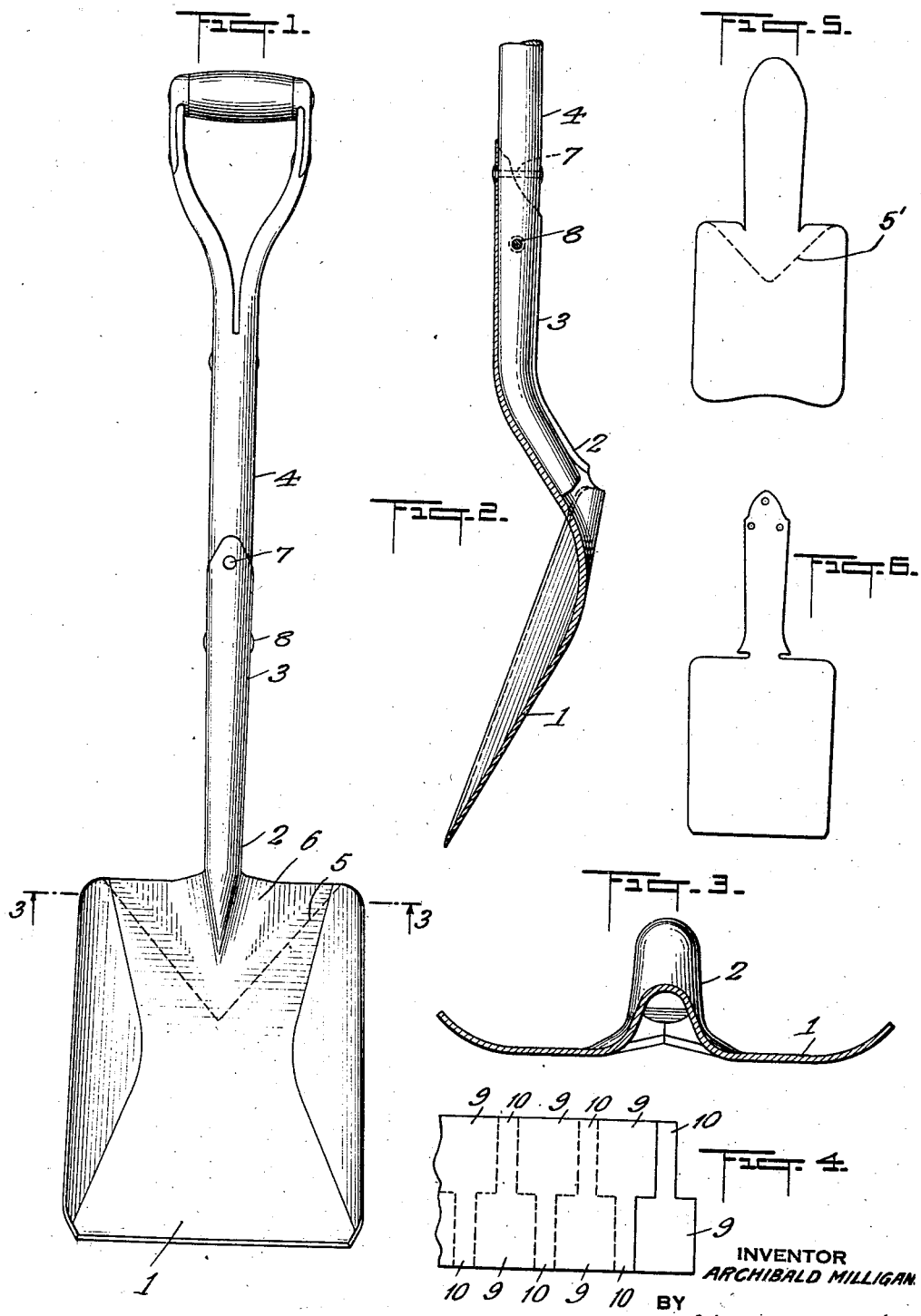
INVENTOR
ARCHIBALD MILLIGAN
BY
Victor D. Borst
ATTORNEY Patented Feb. 21, 1933

1,898,590

UNITED STATES PATENT OFFICE

ARCHIBALD MILLIGAN, OF FREDONIA, NEW YORK, ASSIGNOR OF ONE-HALF TO EDWARD W. McCARTY

SHOVEL

Application filed June 19, 1931. Serial No. 545,400.

My invention relates to shovels and in particular to that type of shovel which is made from a single piece of metal. Such shovels may be divided into two classes, one class being known as the solid shank shovel and the other being commonly called the hollow back shovel. The solid shank shovel has been made from bar steel from which blanks are cut for the shovels. The blanks cut from a bar are of T-shape and successive blanks are cut reversely so that the entire bar may be utilized without waste. From these T-shape blanks, the shovels are formed by a series of forging and rolling operations. The head of the T-shape blank is shaped by the forging and rolling operations to form the blade of the shovel, and the stem of the T-shape blank is shaped by the same operations to form a solid shank and a socket. Shovels made in this way have the advantage of having great strength where it is needed, that is, in the shank and at the junction of the shank and the blade. The disadvantage of these solid shank shovels is the expense in manufacture, as the equipment and labor required is very great.

The open back or so-called hollow back shovel has commonly been made from sheet steel and the socket, shank and blade of these shovels are of the same thickness. The shank of the shovel is united to the blade by a ridge or frog formed in the blank to strengthen the shovel at the junction between the shank and the blade. The ridge or frog extends well forward into the blade, approximately one-half of the distance between the back or shoulder of the blade and the front edge of the blade. Although this type of shovel is less expensive to manufacture than the solid shank shovel, there is considerable waste of material. The shovel itself has many disadvantages, among which is the fact that it is weak at those points where it needs strength, particularly at the junction between the shank and blade where the metal has been drawn to form the frog. These shovels, in use, frequently crack and break along the edge of the frog joining the shank and blade.

In accordance with my invention, I provide a shovel which offers the strength of the solid shank shovel and which may be produced less expensively than the hollow back shovel. The shovel embodying my invention is characterized by the fact that the part which sustains the greatest stress is made strongest, the metal of that part being thicker than that of the rest of the shovel. This strengthened part comprises the shank and its connection with the blade including the frog and the immediately surrounding area. The shovel is formed from plate steel as distinguished from bar steel or sheet steel. The plate steel used is of a gage between the bar steel used for the solid shank shovel and the sheet steel used for the hollow back shovel; it is wider than the bar from which the blanks for a solid shank shovel are cut and is not as thick as the bar. The plate is, however, of less width and of greater thickness than the sheet steel from which the hollow back shovels are made. From the plate, blanks are cut which are substantially T-shape, each blank having a section for the blade and a section for the shank and socket of the shovel. These blanks are cut so that successive blanks are reversed, thereby utilizing all the metal of the plate and avoiding any waste. By a succession of forging operations, the metal of each blank is drawn to form the blade, the shank and the socket of the shovel. The metal is so drawn that the shank portion of the shank and socket section of the blank, and a substantially triangular portion of the blade, having the base thereof along the back or shoulder of the blade, and the apex thereof extending down into the blade, are left substantially the same in thickness as the original blank. This triangular portion of the blade includes the line or area of the junction between the shank and the blade where the shank merges into the blade. Outside of this triangular portion of the blade, the metal of the blade section of the blank is drawn to a substantially uniform thickness. The metal of the socket portion of the shank and socket section of the blank is drawn so that the thickness thereof tapers toward the outer or handle end, which end is drawn to a very thin edge so that it may better unite with the handle. The blade and the shank and socket are then formed and shaped. The shank and socket are made tubular and together form a reverse taper, the shank flaring outwardly to merge into the blade and the socket flaring outwardly towards the outer or handle end to receive a complementary tapering handle. The shank of the shovel is curved so that between the blade and the socket there is formed a substantially reverse curve. By leaving the shank and the portion of the blade at which the shank merges into the blade of the same thickness as the original blank, the requisite strength is obtained at these points and the resulting shovel is no heavier than the ordinary hollow back shovel.

With this method, the shovel of this invention may be made less expensively than the ordinary hollow back shovel. With the ordinary hollow back shovel which is made from sheet steel, there is considerable waste. The value of the material so wasted is greater than the cost of the extra labor required in drawing the metal of the shovel of this invention.

A shovel embodying my invention is illustrated in the accompanying drawing in which:

Fig. 1 is an elevation of a shovel constructed in accordance with my invention;

Fig. 2 is a fragmentary sectional, side elevation of the same;

Fig. 3 is a sectional, end elevation taken on the line 3—3 of Fig. 1;

Fig. 4 is a plan of a plate having the blanks outlined thereon;

Fig. 5 is a front elevation of a blank after it has been drawn; and

Fig. 6 is a front elevation of a blank after being trimmed and prior to the shaping of the blank.

The shovel illustrated in the drawing includes a blade 1, a shank 2, a socket 3 and a handle 4 which may be any of the handles commonly used. The blade, shank and socket are integral, being formed from a single piece of metal. The blade, which is shaped as shown, has two portions of different thickness, one a triangular portion having the base thereof along the rear edge or shoulder of the blade and the apex extending well down into the blade. Metal in this portion of the blade which is indicated on the blade by the broken line 5 is of greater thickness than the remainder of the blade, the thickness of this portion tapering down to the thickness of the remainder of the blade which is of substantially uniform thickness. Within this triangular portion of the blade there is a small triangular ridge or frog 6 where the shank merges into the blade.

The shank of the shovel unites the blade and the socket and in effect constitutes the lower portion of the socket, the shank and socket being tubular. The metal of the shank is of the same thickness as the metal of the aforementioned triangular portion of the blade, and the shank has a reverse taper, flaring out at the blade end to merge into the blade at the frog 6, and flaring outwardly at the socket end to form a continuation of the socket which is tapered. The shank is curved so that there is a substantially reverse curve between the blade and the socket.

The metal of the socket tapers in thickness from the thickness of the metal of the shank to a very thin edge at the outer end. The thin edge at the outer end of the socket forms with the handle a substantially flush or smooth joint. The taper of the socket is such that the circumference of the socket at its outer end is approximately an inch larger than the circumference at the inner end where it joins the hollow shank.

The handle of the shovel is tapered to correspond with the taper of the socket and shank and extends through the socket and shank to the point where the shank flares outwardly to merge into the blade. The handle is secured in the socket, in addition to its frictional engagement with the walls thereof by two rivets 7 and 8 at right angles to each other. The outer end of the socket is shaped as shown so that one side is longer than the other. The rivet 7 extends through this extended portion of the wall of the socket and through the handle, and the rivet 8 extends through the handle and diametrically opposite points of the socket, at right angles to the rivet 7.

The blade, shank and socket of the shovel described above are formed from blanks cut from steel plate, the plate varying in width from 10 to 13 inches, depending upon the size of the shovel, and being an 8 gauge steel or about 3/16th of an inch in thickness. Such a plate is illustrated in Figure 4. The character of the blanks cut from the plate are somewhat T-shaped having a section 9 for the blade and a section 10 for the shank and socket. Successive blanks are reversed so that the shank and socket section of one blank is between the blade sections of the blanks on either side, and the blade section is between the shank and socket sections of the blanks on either side. This reversal of the blanks avoids any waste other than the material left at the ends of a plate.

Each blank so cut is submitted to a series of hammering or rolling operations to draw the metal of certain portions of the blank. The metal of the shank portion of the shank and socket section and the triangular portion of the blade of the shovel, indicated by broken lines 5' in Figure 5, is not drawn by these hammering or rolling operations, or depending upon the weight of the shovel desired, these portions of the blank may be drawn a certain amount, and the metal of the rest of the blank drawn a correspondingly greater amount. The metal of the blade, outside of the aforementioned triangular portion, is drawn to a uniform thickness, the metal at the edge of the triangular portion of the blade tapering in thickness to the thickness of the remainder of the blade. By further rolling and hammering operations, the metal of the socket section of the blank is gradually thinned down so that the thickness of the metal tapers to the thickness of substantially an 18 gauge at the extreme outer or handle end.

The shank and socket sections are trimmed as shown in Figure 6 to take care of the reverse tapers on the finished shovel. A cut is made at the junction of the shoulder of the blade and the shank, on either side of the shank, as illustrated in Figure 6, so that when the shank and socket sections are shaped, the two edges of the shank and socket section will meet throughout the length of the continuous shank and socket.

After the metal has been properly drawn and trimmed, it is shaped. The metal of the shank and socket section of the blank is shaped to form a tubular shank and socket, the ridge or frog 6 is formed in the blade and the shank is curved so that there is a substantially reverse curve between the blade and the socket.

It is obvious that various changes may be made in the details of the shovel described above by those skilled in the art within the principle and scope of my invention as expressed in the appended claims.

I claim:

1. A hollow back shovel consisting of a single piece of plate metal comprising a blade and a tubular shank and socket, the blade having two portions of different thickness, the thicker portion including the frog and the junction with the shank and surrounded except at the back edge by the portion of lesser thickness.

2. A shovel of the hollow back type comprising a one-piece steel member in the form of a sheet of variable thickness and constituting a blade and a tubular shank and socket, the wall of the shank and an adjoining portion of the blade including the section in which the shank merges into the blade being of greatest thickness, and the rest of the blade being of a lesser and substantially uniform thickness with the transition gradual between the two blade portions of different thickness.

3. A shovel of the hollow back type comprising a one-piece steel member in the form of a sheet of variable thickness and constituting a blade and a tubular shank and socket, the wall of the shank and an adjoining approximately triangular portion of the blade including the section in which the shank merges into the blade being of greatest thickness, and the rest of the blade being of a lesser and substantially uniform thickness with the transition gradual between the two blade portions of different thickness.

In witness whereof, I hereunto subscribe my signature.

ARCHIBALD MILLIGAN.